(12) United States Patent
Mänken et al.

(10) Patent No.: US 6,427,110 B1
(45) Date of Patent: Jul. 30, 2002

(54) APPARATUS FOR CONTROLLING A DRIVE SYSTEM FOR AN INDUSTRIAL TRUCK

(75) Inventors: Frank Mänken; Nis-Georg Nissen, both of Henstedt/Ulzburg; Ralf Baginski, Neetze; Andreas Rogg, Lübeck, all of (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/916,070

(22) Filed: Jul. 26, 2001

(30) Foreign Application Priority Data

Jul. 26, 2000 (DE) .......................................... 100 37 676

(51) Int. Cl.$^7$ .............................................. B60K 31/08
(52) U.S. Cl. .......................... 701/93; 180/165; 180/175; 180/176
(58) Field of Search .............................. 701/93, 83, 36, 701/91; 180/165, 170, 175, 176

(56) References Cited

U.S. PATENT DOCUMENTS

| 4,107,776 A | * | 8/1978 | Beale ........................... 477/43 |
| 4,242,995 A | * | 1/1981 | Schramm et al. ...... 123/406.23 |
| 4,606,322 A | * | 8/1986 | Reid et al. ................... 123/458 |

FOREIGN PATENT DOCUMENTS

| DE | 28 43 256 | 4/1980 |
| JP | 2-3547 | 1/1990 |

OTHER PUBLICATIONS

Company prospectus Poclain Hydraulics Ph, Feb., 1998.
Abstract of DE2843256 (esp@cenet database).

* cited by examiner

Primary Examiner—William A. Cuchlinski, Jr.
Assistant Examiner—Olga Hernandez
(74) Attorney, Agent, or Firm—Vidas, Arrett & Steinkraus, P.A.

(57) ABSTRACT

An apparatus for controlling a drive system for an industrial truck having an internal combustion engine and a hydrostatic transmission wherein the hydrostatic transmission has a pump the delivery volume of which is variable and at least one hydraulic engine acting on at least one wheel of the industrial truck, comprising a first controller for the speed of the industrial truck in which a desired speed value compares to a actual value arriving from a speed transducer, further in which a speed controller determines a corresponding desired motive force and in which the signal for the motive force and the actual speed is provided to a characteristics stage in which at least one characteristic is stored which assigns approximately optimal rpm values to power values of the internal combustion engine and presets a corresponding desired-value signal for the number of revolutions of the internal combustion engine, and a second controller underlying the first controller having a desired-value and actual-value comparator in which an actual value of the pump arriving from a pressure transducer is compared to desired-pressure value, further in which a pressure controller produces a variation signal for the delivery volume in the pump, wherein a desired-value transducer for the pressure determines the desired value from the desired motive force and parameters of the drive system.

14 Claims, 1 Drawing Sheet

APPARATUS FOR CONTROLLING A DRIVE SYSTEM FOR AN INDUSTRIAL TRUCK

This invention relates to an apparatus for controlling a drive system for an industrial truck according to claim 1.

Industrial trucks which are intended to be given a large radius of action or a high efficiency are powered by internal combustion engines. Diesel engines or spark ignition engines powered by fuel gas are mainly used for this purpose.

It is known to adapt the number of revolutions and the torque of the internal combustion engine to the requirements made to the driving wheels by means of a hydrostatic transmission. A hydrostatic transmission usually comprises a hydraulic pump the delivery volume of which is variable and a hydraulic engine. If a differential mechanism is to be realized two hydraulic engines are used which, in turn, are variable in their delivery volumes, if required. The hydraulic pump usually is structured so as to allow four-quadrant operation, which means that powering and braking it is possible in the forward and backward directions.

It is known from the company brochure "POCLAIN HYDRAULICS PH" of February, 1998 to employ an electronic control which coordinates the number of revolutions of the internal combustion engine and the delivery volume set for the hydraulic pump with the position of the accelerator and the brake pedal. The delivery volume is varied by a servo-cylinder by means of a lever. The servo-cylinder is acted on by hydraulic oil via two electrically operated proportional valves from two sides. The supply unit of the varing mechanism comprises the feed pump and a pressure relief valve.

As a rule, monotonically increasing characteristics are preset which assign a number of revolutions of the internal combustion engine and a delivery volume and, hence, a volume flow to each accelerator position. For a flexible drivability, the target values are reached via ramps which limit the amounts of such variations. This also restricts the acceleration of the industrial truck to an admissible rate. Admissible rates are determined via the power potential of the internal combustion engine and the admissible pressure of the hydraulic system.

If vehicles are loaded the hydrostatic transmission might happen to require the internal combustion engine to deliver a torque that it is unable to deliver. To prevent the internal combustion engine from being "stalled" it has become known from the company brochure "Elektronisch geregelter Fahrantrieb fur Gabelstapler" by Peter Dschida of Brueninghaus Hydromatik GmbH to take appropriate countermeasures for an electronically controlled travelling mechanism for fork-lift trucks. It is detected here that the internal combustion engine is incapable of achieving the target number of revolutions. As a consequence, the delivery volume of the hydraulic pump is reduced, which relieves the internal combustion engine. A hydraulic pump having a constant delivery volume for the lifting and other functions of the industrial truck frequently is connected, in addition to a geared pump, to the shaft of the internal combustion engine. The electronic control presets a larger number of revolutions for the internal combustion engine if lifting speeds are larger. However, to prevent the vehicle from getting accelerated the delivery volume of the hydraulic pump of the travelling mechanism is reduced accordingly.

The electronic control which is known has the disadvantage that the number of revolutions of the internal combustion engine is dependent on the travelling speed. The measure which as is known makes it impossible for the internal combustion engine to get stalled is relatively sluggish and pressure-induced vibrations, a juddery motion of the vehicle, and a non-optimal utilization of the power potential of the internal combustion engine may readily occur. The inflexible delivery volume preset causes the vehicle to start up with a jerk and causes hydraulic vibrations if disturbing factors act on it.

It is the object of the invention to provide an apparatus for controlling a drive system for an industrial truck which leads to minimum fuel consumption, only applies admissible torques to the internal combustion engine, and improves its drivability.

The object is attained by the features of claim 1.

The inventive apparatus uses a cascaded control. The cascade comprises an overlying speed control circuit and an underlying pressure control circuit. The pressure controller compares a transmission pressure measured to a preset pressure (a desired-pressure value) with the pressure controller speedily varying the hydraulic pump delivery volume so as to cause the control error to disappear. The overlying speed controller compares the travelling speed desired to the one measured, calculating a desired motive force therefrom. The motive force which is desired is converted, in a way which yet is to be described, into a required pumping pressure which is imposed onto the pressure controller as a desired-pressure value.

A characteristic, which indicates an optimal-consumption speed for a given power, exists for each internal combustion engine. The driving power required may be calculated from the travelling speed and the motive force. This allows to preset a desired number of revolutions for an internal combustion engine from the characteristics stage in accordance with the characteristic chosen. This one will then be imposed onto a common speed controller for an internal combustion engine.

Since the number of revolutions of the internal combustion engine is chosen according to the power requirement an optimal-consumption operation may be ensured. Pressure can be limited to the values admitted by the components at any point of operation. This makes it possible to prevent the engine from getting stalled and to set the limitation to a maximum value for the transmission pressure. In addition, the inventive apparatus improves the drivability and levels out vibrations caused by pressure. The latter are avoided by dimensioning the pressure controller in a proper way.

If the internal combustion engine drives another hydraulic pump, e.g. for the lifting system, the number of revolutions of the internal combustion engine requires to be chosen higher to achieve a sufficient lifting speed. As a result, the number of revolutions ceases to be completely at the minimum of consumption. However, an increase in travelling speed does not take place because this does not influence the presetting effected for of the motive force and the hydraulic pressure. The pressure controller automatically reduces the delivery volume in order not to increase the pressure.

In the inventive apparatus, the engine's characteristics are derived from the rpm-torque-efficiency characteristic diagram of the internal combustion engine. In an aspect of the invention, an rpm-torque-efficiency characteristic diagram for the pump is stored in the characteristics stage for being taken into account in determining the desired rpm value. Similarly, in another aspect of the invention, a travelling speed-torque-efficiency characteristic diagram for the hydraulic engine can be stored in the characteristics stage for being taken into account in determining the desired rpm value.

A sensor may be disposed on the wheel or the hydraulic engine to determine the number of revolutions for the inventive apparatus and the speed transducer may determine the speed from the number of revolutions and the radius of the wheel. Alternatively, an rpm sensor may measure the number of revolutions of the internal combustion engine and calculate the speed therefrom and from the delivery volume of the pump (which corresponds to the transmission gear ratio) while taking into account the radius of the wheel.

At least one pressure sensor may be provided, as a pressure transducer, at the outlet of the pump. In another aspect of the invention, the pump may have hydraulic variation inlets which are connected to the pressurized side of an auxiliary pressure source via a proportional valve each. The control input of the proportional valves is acted on by the desired value of the desired-value transducer.

The characteristic which is employed may be different depending on the operating state of the inventive apparatus or internal combustion engine. Therefore, an aspect of the invention provides that the characteristics stage should have several sub-stages storing a characteristic each and a switch-over device is provided to change over to a sub-stage desired. The switch-over device may have a manually operable switch or may be actuated in dependence on the position of the accelerator or its speed of actuation.

In an aspect of the invention, the number of revolutions of the internal combustion engine, the volume displaced by the hydraulic pump, and the number of revolutions of the driven wheel may be resorted to for a determination of the actual-pressure value in the hydrostatic transmission. Alternatively, the actual-pressure value may be determined from the torque of the internal combustion engine and the volume displaced by the hydraulic pump.

Finally, the actual-pressure value may also be determined from the pressure in the servo-cylinder for adjusting the hydraulic pump and from the number of revolutions of the internal combustion engine. The way of determination may also be chosen different depending on the operating state which exists, e.g. depending on the number of revolutions.

As was already explained previously the inventive apparatus permits to limit the pressure in the hydrostatic transmission, thus avoiding an overload of the internal combustion engine. For instance, this is necessary if the internal combustion engine runs up and a relatively high motive force has been required already. In this respect, an aspect of the invention provides that a controllable limitation stage is interposed between the desired-value transducer and the desired-value and actual-value comparator of the pressure control circuit, a second characteristics stage in which an rpm-torque characteristic of the internal combustion engine is stored and provides an output signal to the pressure relief stage, and the inlet is connected to an rpm transducer such that the pressure relief stage presets a pressure signal corresponding to the admissible torque according to a momental value of the characteristics stage and the level of the varying signal for the pump. The characteristic in the second characteristics stage may be obtained from a conversion of the characteristic(s) in the first characteristics stage and the corresponding hydraulic pressure and the motive force may be calculated via the actual delivery volume of the hydraulic pump in order to avoid stalling the internal combustion engine. The desired-value and actual-value transducer, for instance, determines the desired-pressure value for the pressure control circuit from the value desired for the motive force, the radius of the vehicle wheel, and the volume displaced by the hydraulic engine.

It also was set forth previously that the internal combustion engine may drive a second pump having a constant or variable delivery volume for a hydraulic circuit, this having no adverse effect on the efficiency of the inventive apparatus.

The invention will now be explained in more detail with reference to an embodiment shown in the drawings.

Figure 1:
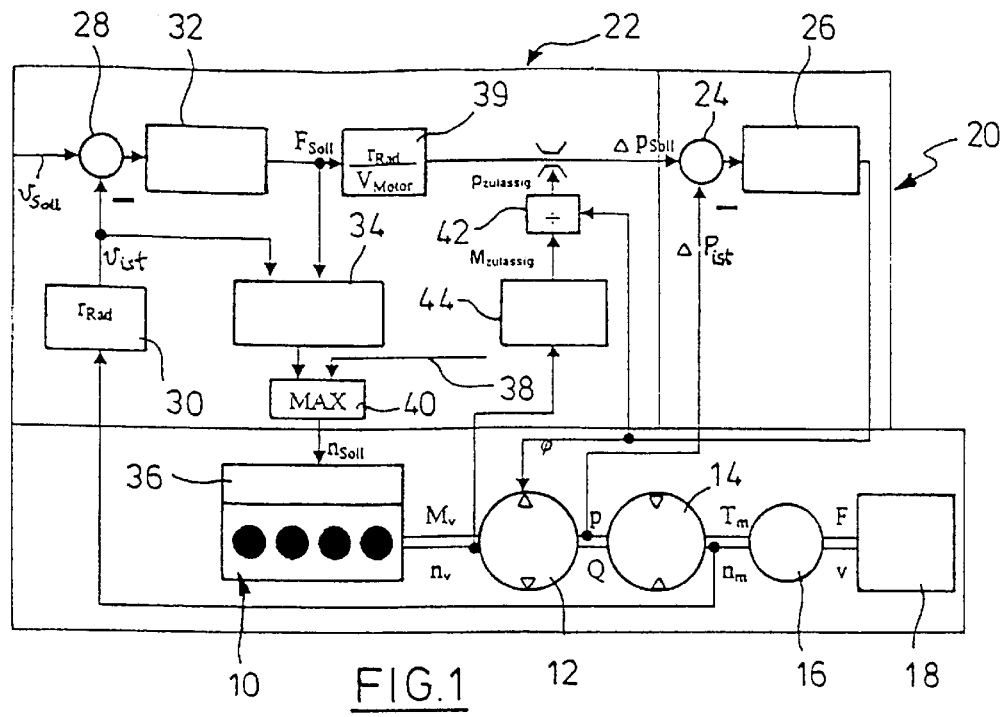
FIG. 1 shows a circuit diagram for an apparatus according to the invention.

FIG. 1 shows an internal combustion engine 10 which drives a hydraulic pump 12 having a variable delivery volume. The hydraulic pump 12 is suited for use with four-quadrant operation. The hydraulic pump 12 feeds a fluid to a hydraulic engine which drives a wheel 16 of an industrial truck 18 (not shown). Up to this point, it will be a drive of an industrial truck, which is known as such, by an internal combustion engine which has a hydrostatic transmission.

The drive system diagrammatically shown in FIG. 1 comprises an underlying pressure control circuit 20 and an overlying speed control circuit 22. A desired-value and actual-value comparator 24 of the pressure control circuit 20 receives a desired value $\Delta p_{Soll}$ from a desired-value transducer 39, and an actual value $p_{ist}$. $p_{ist}$ corresponds to the differential pressure in the hydrostatic transmission and, for instance, may be determined by at least one pressure sensor or also by other parameters to be measured, e.g. from the number of revolutions of the internal combustion engine, the volume displaced by the hydraulic pump, and the number of revolutions of the wheel or from the number of revolutions of the internal combustion engine and the volume displaced by the hydraulic pump. A pressure controller 26 provides a corresponding signal $\phi$ to the pump 12.

A desired-value and actual-value comparator 28 of the speed control circuit 22 receives a desired value $V_{Soll}$ for the speed of the industrial truck 18, e.g. from an accelerator. A actual-value transducer 30 for the speed is connected to an rpm transducer where the rpm transducer measures the number of revolutions $n_m$ at the outlet of the hydrostatic transmission or on the wheel 16 of the industrial truck 18. The actual-value transducer 30 determines the actual speed via the radius $r_{Rad}$ of the wheel 16. A speed controller 32 determines a desired-value signal $F_{Soll}$ for the motive force of the drive system.

A first characteristics stage 34 has stored therein a characteristics field which indicates an optimal-consumption number of revolutions. Alternative characteristics can optimize the dynamic behaviour of the internal combustion engine 10 or constitute a compromise. The characteristics stage 34 receives the signal $F_{Soll}$ and the signal $V_{ist}$ and determines the power required and determines the optimal number of revolutions from the corresponding characteristic and provides a desired rpm value $n_{Soll}$ to a speed controller 36 of the internal combustion engine 10. If the internal combustion engine 10 drives another pump (not shown), e.g. for a hydraulic circuit of the industrial truck, a number of revolutions which is higher than the optimal number of revolutions will possibly be required to allow a faster response of the hydraulic circuit or to influence the speed of variation operations in the hydraulic circuit. To this end, an appropriate signal is provided to the stage 40 MAX via the active-function line 38, which increases the desired rpm value $n_{Soll}$ by a corresponding amount, but only up to a maximum value.

The desired value $F_{Soll}$ is converted to a desired-pressure value $\Delta p_{Soll}$ in the desired-value transducer 39, namely from the volume displaced by the hydraulic engine 14 and the radius of the wheel 16.

The active-action line for the desired-pressure value $\Delta p_{Soll}$ is acted on by the pressure relief stage 42, which limits the desired pressure to a maximum admissible value $\Delta p_{zulässig}$. To this end, a second characteristics stage 44 is provided in which an rpm-and-torque characteristic of the internal combustion engine 10 is stored. The number of revolutions $n_v$ of the internal combustion engine is provided to the characteristics stage 44 and the maximum admissible momental value is determined therefrom in the characteristics stage 44. This value is converted into an admissible pressure in the pressure relief stage 42 according to the variation signal $\phi$ for the volume displaced by the pump 12. This way avoids overloading the internal combustion engine as a result of too high a power requirement. This way can also limit the pressure in the hydrostatic transmission to a maximum value.

Figure 2:
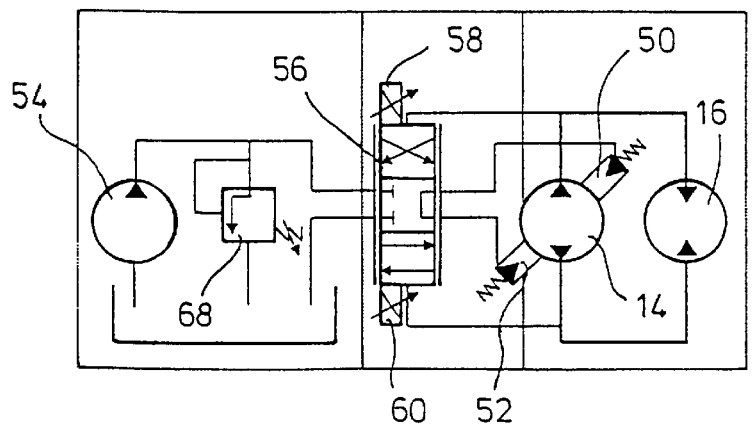
FIG. 2 shows a circuit diagram for a hydraulic pressure control of the hydrostatic transmission of the apparatus of FIG. 1.

FIG. 2 shows a hydraulic pressure control for the pump 12 and the engine 14 of the hydraulic transmission of FIG. 1. The hydraulic pressure is applied to the variation inlets 50, 52 of the pump 14 via an auxiliary pump 54. The auxiliary pump acts on the inlet of the sliding valve 56 which has electromagnetic control inputs 58, 60. They are acted on by the signal $\Delta p$ of the desired-value transducer 39 of FIG. 1. Furthermore, the sliding valve 56 has two hydraulic control inputs which connect with the hydraulic circuit of the hydrostatic transmission and apply the differential pressure to the sliding valve 56, which corresponds to the real-pressure value.

Figure 3:
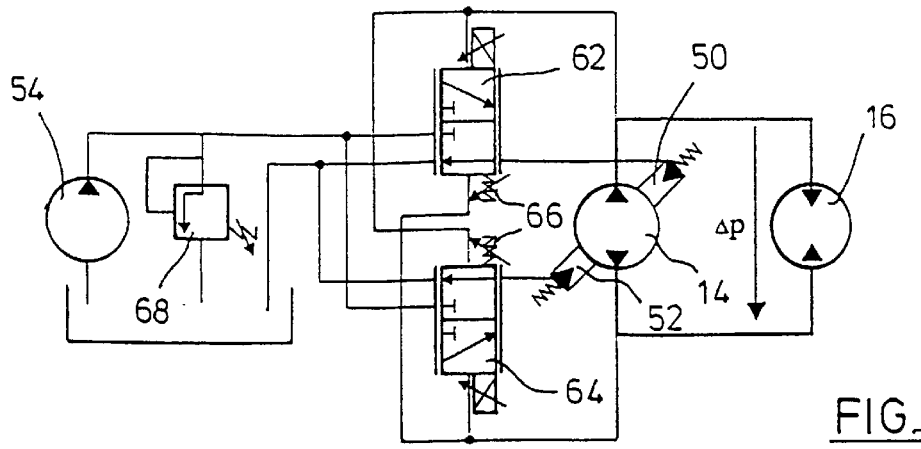
FIG. 3 shows an alternative aspect of a hydraulic pressure control for the hydrostatic transmission of the apparatus of FIG. 1.

In the embodiment of FIG. 3, two proportional valves 62, 64 are provided in lieu of one sliding valve, which valves are biased by a spring 66 to the neutral position. For the rest, the way of action corresponds to the one which was described for FIG. 2. The two embodiments of FIGS. 2 and 3 provide a pressure control valve 68 to keep the pressure constant in the pump 54. This pump may also be driven by the internal combustion engine.

What is claimed is:

1. An apparatus for controlling a drive system for an industrial truck having an internal combustion engine and a hydrostatic transmission wherein the hydrostatic transmission has a pump the delivery volume of which is variable and at least one hydraulic engine acting on at least one wheel of the industrial truck, comprising:

a first controller (22) for the speed of the industrial truck in which a desired speed value ($V_{Soll}$) compares to a actual value arriving from a speed transducer (30), further in which a speed controller (32) determines a corresponding desired motive force ($F_{Soll}$) and in which the signal for the motive force and the actual speed is provided to a characteristics stage (34) in which at least one characteristic is stored which assigns approximately optimal rpm values to power values of the internal combustion engine (10) and presets a corresponding desired-value signal for the number of revolutions of the internal combustion engine (10), and a second controller (20) underlying the first controller (22) having a desired-value and actual-value comparator in which an actual value of the pump (12) arriving from a pressure transducer is compared to desired-pressure value ($\Delta p_{Soll}$), further in which a pressure controller (26) produces a variation signal for the delivery volume ($\phi$) in the pump (12), wherein a desired-value transducer (39) for the pressure determines the desired value ($\Delta p_{Soll}$) from the desired motive force ($F_{Soll}$) and parameters of the drive system.

2. The apparatus according to claim 1, characterized in that a rpm-torque efficiency characteristics field for the pump is stored in the characteristics stage (34) for being taken into account in determining the rpm desired value ($n_{Soll}$).

3. The apparatus according to claim 1, characterized in that a travelling speed-torque-rpm efficiency characteristics field of the hydraulic engine (14) is stored in the characteristics stage (34) for being taken into account in determining the rpm desired value.

4. The apparatus according to claim 1, characterized in that a rpm sensor is disposed on the wheel (16), the hydraulic engine (14) or the internal combustion engine and the speed transducer (30) determines the speed from the number of revolutions ($n_m$) or the delivery volume of the pump (12) while taking into account the radius ($r_{Rad}$) of the wheel.

5. The apparatus according to claim 1, characterized in that the pressure transducer provides at least one pressure sensor at the outlet of the pump (12).

6. The apparatus according to claim 1, characterized in that the pump (14) has hydraulic variation inlets which are connected to a proportional valve (62, 64) each the pressurized sides of which are connected to an auxiliary pump (54) the control input of which is acted on by a control signal which is proportional to the desired value ($\Delta p_{Soll}$) of the desired-value transducer (39) and the hydraulic control input of which is acted on by the differential pressures of the hydrostatic transmission.

7. The apparatus according to claim 1, characterized in that the actual-pressure value is determined from the torque of the internal combustion engine (10) and the volume displaced by the hydraulic engine (14).

8. The apparatus according to claim 1, characterized in that the actual-pressure value is determined from the pressure in a servo-cylinder for setting the pump and the number of revolutions of the internal combustion engine.

9. The apparatus according to claim 1, characterized in that a controllable pressure relief stage (42) is interposed between the desired-pressure value transducer (39) and the desired-value and actual-value comparator of the second controller (20), a second characteristics stage (44) is provided in which a torque-rpm characteristic of the internal combustion engine (10) is stored, an output signal of the second characteristics stage (44) is provided to the pressure relief stage (42), and an input of the characteristics stage (44) is connected to an rpm transducer which determines the number of revolutions of the internal combustion engine (10) such that the pressure relief stage (42) presets a pressure signal ($p_{zulässig}$) corresponding to the admissible torque or the admissible pressure of the transmission according to a momental value of the characteristics stage (44) and the level of the variation signal for the pump (12).

10. The apparatus according to claim 1, characterized in that the internal combustion engine (10) drives a second pump having a constant or variable delivery volume for another hydraulic circuit of the industrial truck.

11. The apparatus according to claim 1, characterized in that the characteristics stage (34) has a plurality of sub-stages storing one characteristic each, and a switch-over device to change over to a sub-stage which is desired.

12. The apparatus according to claim 11, characterized in that the switch-over device has a manually operable switch or is actuated in dependence on the position of an accelerator for the industrial truck and/or the actuation speed thereof.

13. The apparatus according to claim 1, characterized in that the actual-pressure value is determined from the number of revolutions of the internal combustion engine (10), the volume displaced by the hydraulic engine (14), and the number of revolutions of the wheel (16).

14. The apparatus according to claim 13, characterized in that the way of determining the actual-pressure value is varied in dependence on the number of revolutions of the internal combustion engine (10).

* * * * *